United States Patent
Lawyer et al.

(10) Patent No.: US 11,713,774 B2
(45) Date of Patent: Aug. 1, 2023

(54) FLUID PUMP ASSEMBLIES AND KITS, AND RELATED METHODS

(71) Applicant: Ecotech Marine, LLC, Allentown, PA (US)

(72) Inventors: Justin Lawyer, Bethlehem, PA (US); Timothy Marks, Northampton, PA (US); Patrick Clasen, Allentown, PA (US); Christian Clough, Bethlehem, PA (US); Mark Lindenmoyer, Coopersburg, PA (US)

(73) Assignee: EcoTech, LLC, Bethlehem, PA (US)

(*) Notice: Subject to any disclaimer, the term of this patent is extended or adjusted under 35 U.S.C. 154(b) by 706 days.

(21) Appl. No.: 16/677,377

(22) Filed: Nov. 7, 2019

(65) Prior Publication Data

US 2020/0149551 A1 May 14, 2020

Related U.S. Application Data

(60) Provisional application No. 62/757,415, filed on Nov. 8, 2018.

(51) Int. Cl.
*F04D 29/60* (2006.01)
*A01K 63/04* (2006.01)
(Continued)

(52) U.S. Cl.
CPC .......... *F04D 29/606* (2013.01); *A01K 63/047* (2013.01); *F04D 25/0686* (2013.01);
(Continued)

(58) Field of Classification Search
CPC .. F04D 29/606; F04D 25/0686; F04D 29/605; A01K 63/047; H02K 5/132; H02K 5/26; H02K 7/14; H02K 21/22
See application file for complete search history.

(56) References Cited

U.S. PATENT DOCUMENTS 4,283,645 A * 8/1981 Hofmann ............ A01K 63/047
310/108
4,304,532 A 12/1981 McCoy
(Continued)

FOREIGN PATENT DOCUMENTS

CN 203453143 U 2/2014
CN 205173083 U 4/2016
(Continued)

OTHER PUBLICATIONS

Raw Machine Translation of WO2018233100 (A1) ; "Wave Maker Pump Angle Adjusting Structure", Zhang et al.*
(Continued)

*Primary Examiner* — Charles G Freay
*Assistant Examiner* — Lilya Pekarskaya
(74) *Attorney, Agent, or Firm* — Calderon, Safran & Cole P.C.

(57) ABSTRACT

The present invention relates to fluid pump assemblies in general, and in exemplary embodiments to fluid pump assemblies that are magnetically supported in position, and to related kits and methods useful to circulate water in aquariums. The fluid pump assembly comprises an outer mount, an inner mount, and a pump. The outer mount includes at least one outer permanent magnet; the inner mount includes at least one inner permanent magnet; and the pump includes at least one soft magnetic material. The outer permanent magnet, the inner permanent magnet, and the soft magnetic material collectively form a magnetic circuit.

14 Claims, 6 Drawing Sheets

(51) Int. Cl.
*F04D 25/06* (2006.01)
*H02K 5/132* (2006.01)
*H02K 5/26* (2006.01)
*H02K 7/14* (2006.01)
*H02K 21/22* (2006.01)

(52) U.S. Cl.
CPC ............... *H02K 5/132* (2013.01); *H02K 5/26* (2013.01); *H02K 7/14* (2013.01); *H02K 21/22* (2013.01)

(56) References Cited

U.S. PATENT DOCUMENTS

| | | | |
|---|---|---|---|
| 7,393,188 | B2 | 7/2008 | Lawyer |
| 8,366,418 | B2 * | 2/2013 | Tran .................... F04D 29/048 417/420 |
| 8,944,786 | B1 * | 2/2015 | McDougall ........ A61H 33/0091 4/541.3 |
| 10,278,894 | B1 * | 5/2019 | Le ...................... A61H 33/6042 |
| 10,519,956 | B2 * | 12/2019 | Lawyer ............... F04D 29/5806 |
| 2005/0076851 | A1 | 4/2005 | Allis |
| 2006/0192062 | A1 | 8/2006 | Tunze |
| 2007/0136943 | A1 * | 6/2007 | Long .................. A61H 33/0087 4/622 |
| 2008/0107551 | A1 | 5/2008 | Costa |
| 2009/0189034 | A1 * | 7/2009 | Bresolin ................ A01K 63/10 248/206.5 |
| 2014/0064987 | A1 * | 3/2014 | Cox, Jr. ................. H02K 11/33 417/420 |
| 2014/0271285 | A1 | 9/2014 | McDougall |
| 2017/0150702 | A1 * | 6/2017 | Bresolin ............. A01K 63/006 |
| 2019/0200586 | A1 * | 7/2019 | Zhang ................. A01K 63/047 |

FOREIGN PATENT DOCUMENTS

| | | |
|---|---|---|
| CN | 206290497 U | 6/2017 |
| CN | 207701481 U | 8/2018 |
| WO | WO2016013036 A1 | 1/2016 |
| WO | WO20188233100 A1 * | 8/2018 |

OTHER PUBLICATIONS

International Search Report & Written Opinion dated Apr. 29, 2020 from Related PCT Application No. PCT/US2019/060323.

* cited by examiner with the general description given above and the detailed
FLUID PUMP ASSEMBLIES AND KITS, AND RELATED METHODS

CLAIM(S) OF PRIORITY AND CROSS REFERENCE TO RELATED APPLICATION(S)

This application claims the benefit of priority of U.S. provisional application No. 62/757,415 filed in the U.S. Patent & Trademark Office on Nov. 8, 2018, the disclosure of which is incorporated herein by reference in its entirety.

FIELD OF THE INVENTION

The present invention relates to fluid pump assemblies in general, and in exemplary embodiments to fluid pump assemblies that are magnetically supported in position, and to related kits and methods useful to circulate water in aquariums.

BACKGROUND OF THE INVENTION

In order to properly care for fish and other aquatic organisms contained within an aquarium, particularly a reef aquarium, adequate water circulation is required. The role of circulation is twofold: first, circulation acts to constantly mix the aquarium water itself, ensuring that proper chemistry is maintained throughout the entire aquarium. Adequate circulation maintains the equilibrium of oxygen and carbon dioxide by increasing the rate at which water flows within the tank, including from the bottom of the tank to the top. The second role of circulation is related to the nature of the inhabitants of a reef aquarium. Because many reef inhabitants are sessile (they do not move), circulation is the only means by which nutrients such as food and oxygen are brought to these inhabitants. In the ocean, corals and other sessile animals and plants have the benefit of large waves crashing into the reef in a random but consistent fashion. Within the constraints of a glass box or aquarium, a pump is used as an artificial substitute.

Prior aquarium circulating devices and pumps feature two aspects that make them less than ideal. First, some prior designs utilize a mechanical bracket which hangs over the top of the aquarium or sits on the floor of the aquarium in order to support the pump within the aquarium. In some prior pumps in which the motor and the centrifugal propeller are magnetically coupled through the glass, brackets are used to support and align the rotating component within the aquarium. Second, some prior designs required that the pump be located at a location determined by the location of the bracket or be on the bottom of the aquarium due to the weight of the pump. The brackets can obstruct viewing of the aquarium contents.

SUMMARY OF THE INVENTION

The present invention is related to fluid pump assemblies. The invention is also related to kits and methods of making and using fluid pump assemblies. More particularly, the invention is directed to an aquarium pump especially useful in a reef aquarium.

An embodiment of a fluid pump assembly is disclosed. The fluid pump assembly comprises an outer mount, an inner mount, and a motor driven pump. The outer mount includes at least one outer permanent magnet, the inner mount includes at least one inner permanent magnet, and the pump includes at least one soft magnetic material. The outer permanent magnet, the inner permanent magnet, and the soft magnetic material collectively form a magnetic circuit.

Another embodiment is a fluid pump assembly comprising an outer mount, an inner mount, and a motor driven pump. The outer mount includes at least one outer permanent magnet, the inner mount includes at least one inner permanent magnet, and the pump includes at least one steel magnetic component, preferably a mild steel. The outer permanent magnet, the inner permanent magnet, and the steel magnetic component collectively form a magnetic circuit.

In the above embodiments, the outer mount may further include an additional soft magnetic material or an additional steel magnetic component that forms part of the magnetic circuit.

In the above embodiments, the permanent magnets preferably comprise neodymium.

In the above embodiments, magnetic attractive forces between the at least one outer permanent magnet and the at least one inner permanent magnet are sufficiently strong to permit mounting of the outer mount and the inner mount on opposite sides of a glass tank wall of the aquarium in any position desired by the aquarium owner.

In the above embodiments, magnetic attractive forces between the at least one inner permanent magnet and the at least one soft magnetic material or steel magnet component are sufficiently strong to permit mounting of the pump in abutting relationship against the inner mount in any position desired by the aquarium owner.

The above aspects and embodiments may be combined and practiced with one another in any combination, including in combination with further exemplary embodiments described below and illustrated in the drawings.

Other aspects and embodiments of the invention, including assemblies, kits, subassemblies, component parts, methods and processes of making and using, and the like which constitute part of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain principles of the invention. In such drawings.

Figure 1:
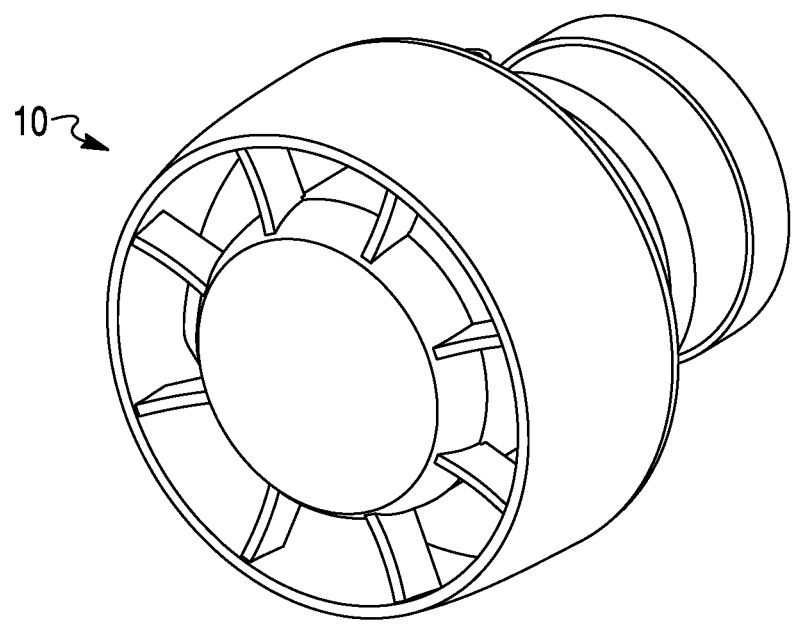
FIG. 1 is a pump-side perspective view of a magnetically mountable fluid pump assembly according to an exemplary embodiment of the invention.

DETAILED DESCRIPTION OF EXEMPLARY EMBODIMENT(S) AND EXEMPLARY METHOD(S) OF THE INVENTION

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

Figure 2:
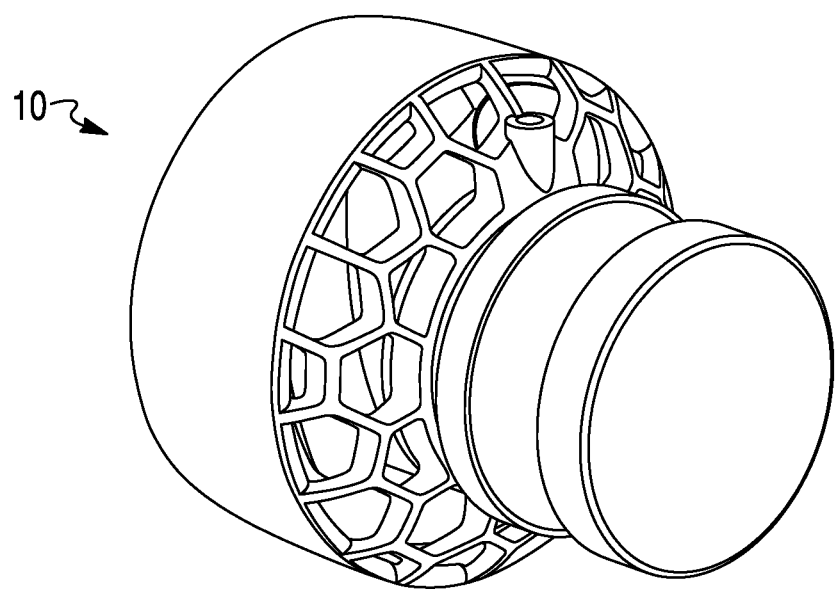
FIG. 2 is an outer mount-side perspective view of the fluid pump assembly of FIG. 1.

Referring now more particularly to the drawings, reference numeral 10 in FIGS. 1 and 2 designates a magnetically mountable fluid pump assembly according to an exemplary embodiment of the present invention. The fluid pump assembly 10 is generally for use in combination with a container or tank, such as an aquarium, provided for holding an amount of liquid, such as water. It will be appreciated that the container or tank may be of any appropriate form, including but not limited to an aquarium. The container or tank may comprise a bottom wall, opposite first and second side walls extending vertically upward from the side edges of the bottom wall, and first and second end walls extending vertically upward from the end edges of the bottom wall and extending between the side walls. The bottom, side, and end walls collectively form a compartment holding the liquid. Optionally, the container or tank may contain a top wall with a lid. The walls, especially the side and end walls, may be made of a transparent material, such as glass, to allow viewing of the contents of the compartment. It should be understood that the fluid pump assembly 10 may be used in association with other types and configurations of containers and tanks than described above.

Figure 3:
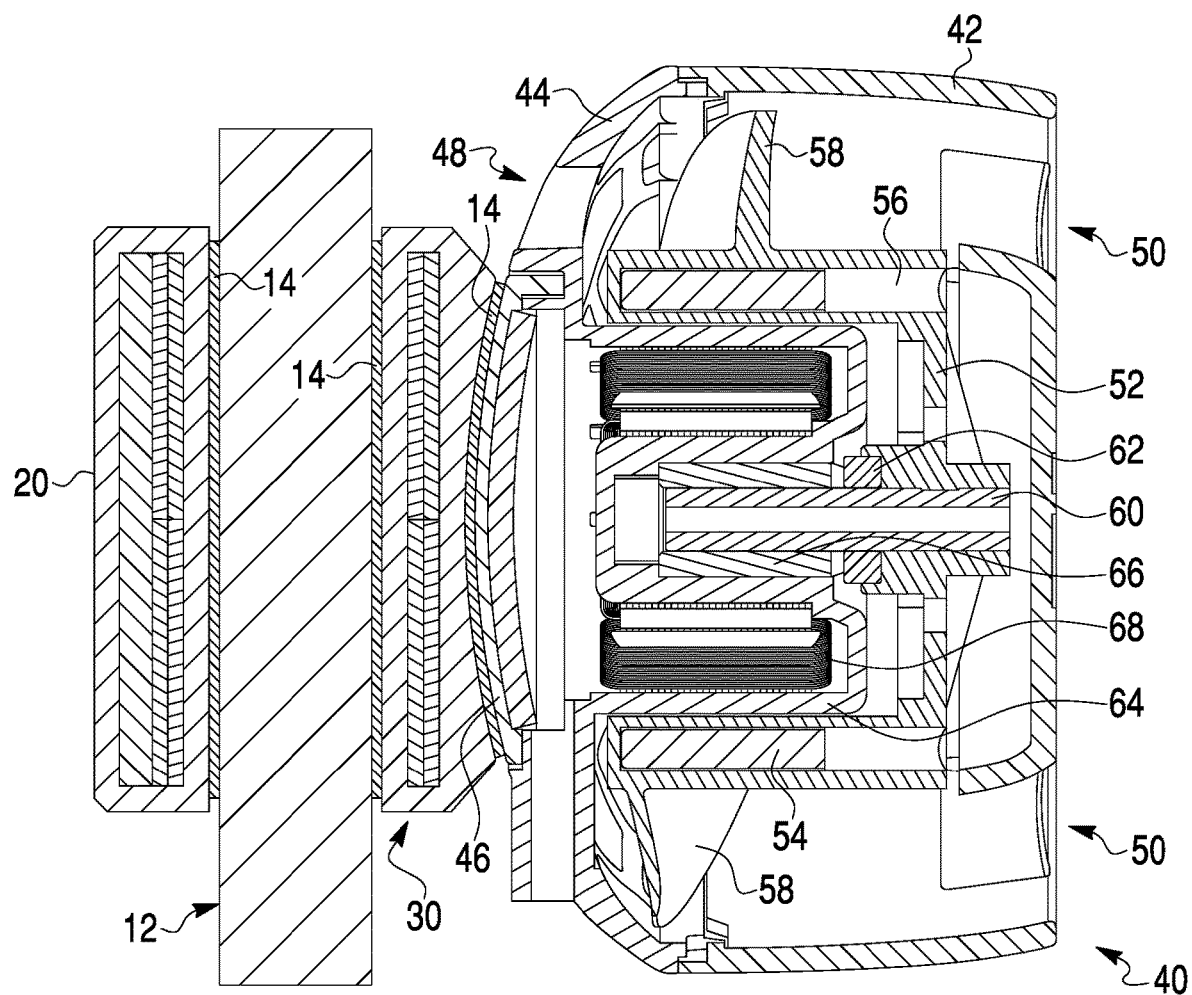
FIG. 3 is a cross-sectional view of the fluid pump assembly of FIGS. 1 and 2.

As best shown in FIG. 3, the magnetically mountable fluid pump assembly 10 includes an outer (or dry-side) mount 20, an inner (or wet-side) mount 30, and a motor driven pump 40. In FIG. 3, the outer and inner mounts 20 and 30 are shown releasably, magnetically coupled on opposite sides of a tank (side or end) wall 12 (shown in fragmented view) of a container, such as an aquarium. Similarly, the inner mount 30 is magnetically coupled to the pump 40. Magnetic coupling will be described in further detail below. Optionally, layers of frictional material (also referred to herein as friction layers) 14 are provided at the interface of the outer mount 20 and the tank wall 12 (e.g., with the friction layer 14 adhesively secured to the outer mount 20), at the interface of the inner mount 30 and the tank wall 12 (e.g., with the friction layer 14 adhesively secured to the inner mount 30), and between an opposite side of the inner mount 30 and the pump 40 (e.g., with the friction layer(s) 14 adhesively secured to the inner mount 30 and/or the pump 40). The friction layers 14 can be made of the same material or different materials, including, for example, rubber, such as silicone rubber, neoprene rubber, etc. Mounting of the fluid pump assembly 10 on the tank wall 12 is preferably bracketless and without any mechanical support, because the magnetic attractive forces (alone or in combination with the friction layers 14) are sufficient to mount the fluid pump assembly 10 on the tank wall 12 with the fluid pump assembly being retained by magnetic attraction at the location desired by the aquarium owner.

Figure 4:
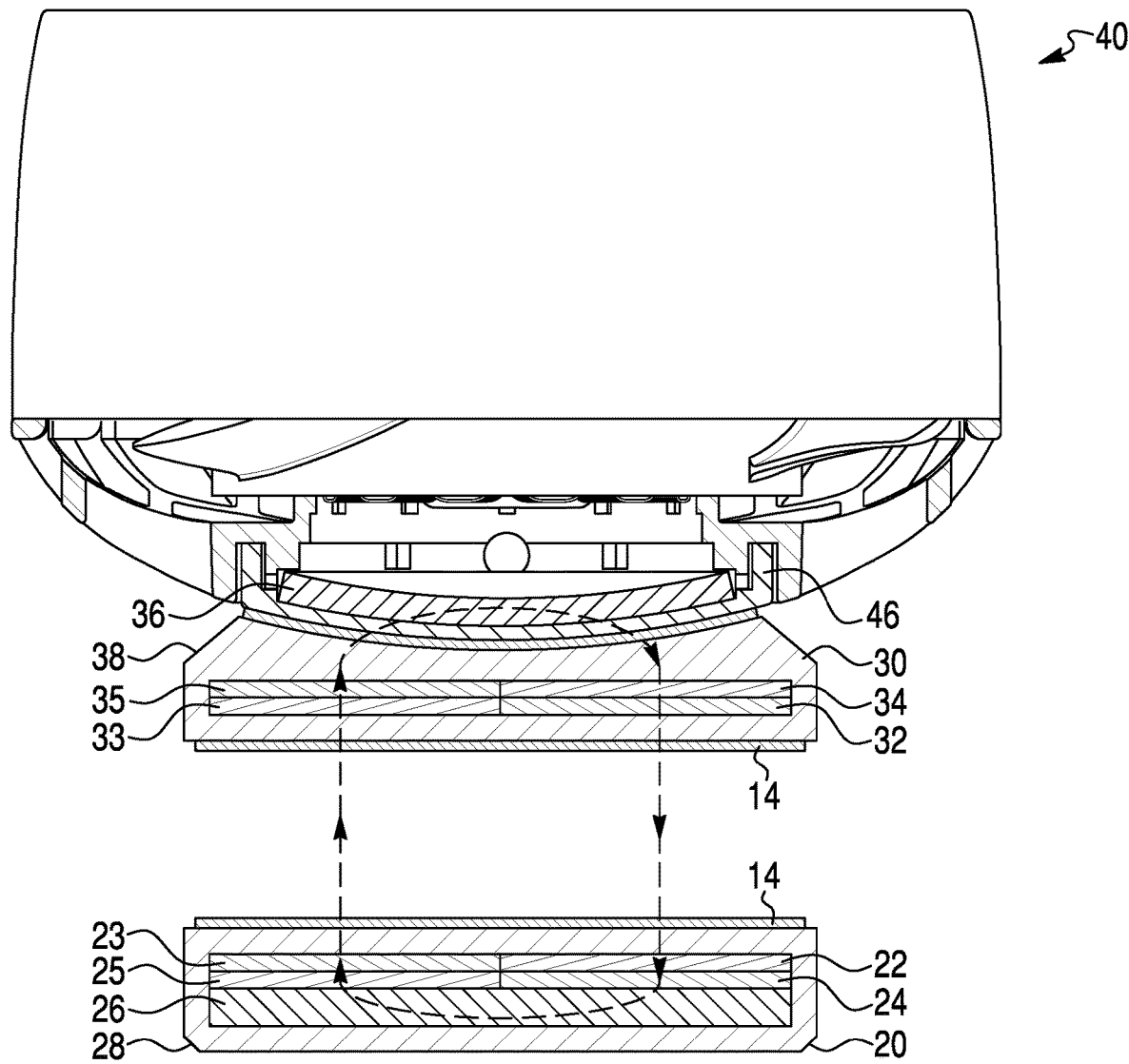
FIG. 4 is an overhead, partially cutaway view of the fluid pump assembly of FIGS. 1 through 3 with arrows depicting a closed path magnetic circuit, to which a magnetic field, represented as lines/arrows of magnetic flux, is generally confined.

As best shown in FIG. 3, the pump 40 includes a housing comprising an outer cover (or rotor cover) 42, a stator outer shell 44 connected to the outer cover 42, and a rear cover 46 connected to the stator outer shell 44. The connections may be, for example, any suitable mechanical fastener, screw threads, clips, etc. Alternatively, the outer cover 42, stator outer shell 44 and outer cover 42 may be adhered together, such as adhesively or acoustically bonded. The outer cover 42, stator outer shell 44 and outer cover 42 preferably are formed from a polymer material, in order to not adversely affect the magnetic flux of the magnetic circuit. The stator outer shell 44 has inlets 48 fluidly communicating with the tank compartment for receiving liquid, such as water, into the rear side (left side in FIG. 3 closer to the tank wall 12) of the pump 40. FIG. 2 shows the stator outer shell 44 as a honeycomb structure defining the inlets 48. The outer cover 42 has outlets 50 (seen in perspective in FIG. 1) fluidly communicating with the tank compartment for expelling liquid, such as water, from the front side (right side in FIG. 3 farther from the tank wall 12) of the pump 40. An annular channel or passage (unnumbered) through the housing is provided between the inlets 48 and the outlets 50 for allowing the flow of fluid therethrough. As best shown in FIG. 4, the rear 70 of the housing, including the rear cover 46, preferably forms a convex surface. Preferably, the convex surface forms a spherical cap.

The pump 40 further includes a rotor body 52 having an annular compartment (unnumbered). Rotor magnets 54 are received in the annular compartment of the rotor body 52. Rotor magnet encapsulation 56 sealingly retains the rotor magnets 54 in the annular compartment and prevents water ingress to protect the rotor magnets 54 from the water environment in which they operate. Salt water is highly corrosive and would quickly oxidize the rotor magnets 54, particularly NbFeB magnets that are used, if allowed to come in contact with the rotor magnets 54. Encapsulation may be accomplished by methods know in the art, preferably by covering the rotor magnets 54 with an epoxy coating. The outer periphery of the rotor body 52 includes one or more propellers (or fins or blades) 58, which may be attached to or integrally formed with the rotor body 52. The propellers 58 are axially aligned with the outlets 48 and the inlets 50 for causing the flow of fluid through the annular channel/passage of the pump 40. The rotor body 52 is mounted on a rotor axle 60. The rotor body 52, the rotor axle 60, and a rotor thrust bearing 62 rotate (spin) in unison.

The pump 40 still further includes a stator inner shell 64 integrally connected to the stator outer shell 44. A stator bearing 66 is concentrically arranged between in innermost cylindrical portion of the stator inner shell 64 and the rotor axle 60. The stator inner shell 64 receives a stator 68, which typically includes a group of electromagnets with a field coil or field winding. An insulated electrical wire (not shown) feeds electricity to the stator 68 to provide a rotating magnetic field that interacts with the rotor magnets 54 to rotationally drive the rotor body 52. Alternatively, the pump 40 may be equipped with a battery power source (not shown). The rotating propellers 58 draw water into the pump 40 through the inlets 48, and the water flows through the annular channel within the rotor cover 42 to discharge through the outlets 50 and thereby circulate the flow of water in the tank.

Although the pump 40 is described above in connection with an illustrated, exemplary embodiment, it should be understood that the fluid pump assembly 10 may include other pumps suitable for water circulation, including, for example, conventional ones used with aquariums.

Figure 5:
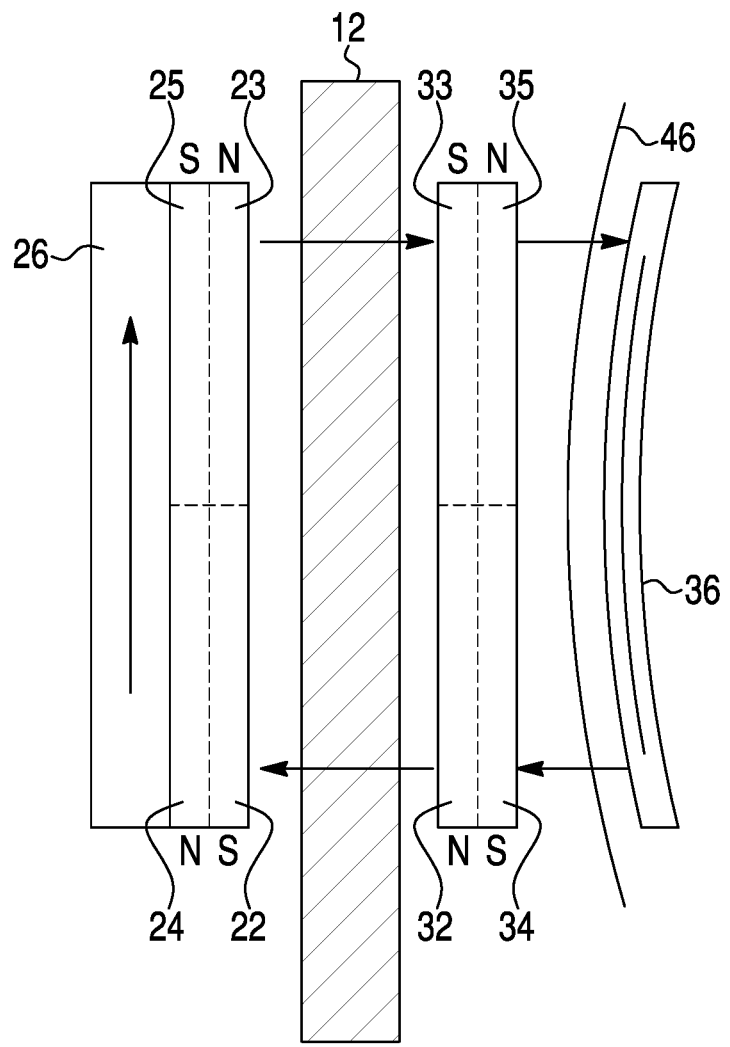
FIG. 5 is a simplified cross-sectional view of magnetic components of the fluid pump assembly of FIGS. 1 through 4, with arrows depicting the magnetic circuit.
Figure 6:
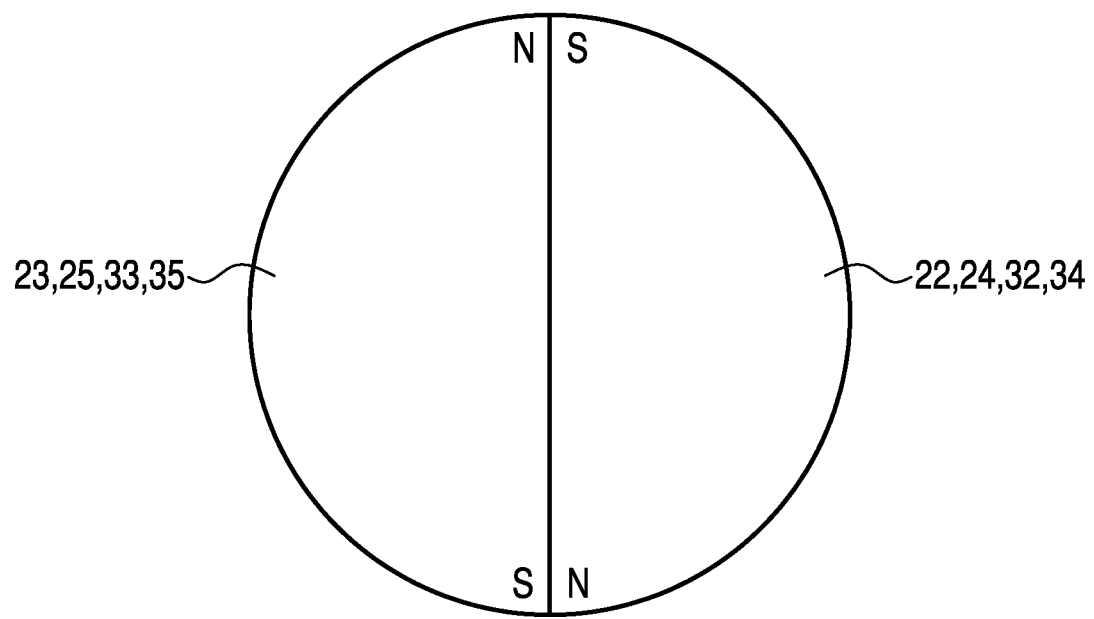
FIG. 6 is a plan view of permanent magnet components of the magnetic circuit of FIGS. 4 and 5.

Referring now more particularly to FIGS. 4 and 5, the outer mount 20 comprises permanent magnets 22, 23, 24, and 25, and the inner mount 30 comprises permanent magnets 32, 33, 34, and 35. The permanent magnets 22-25 and 32-35 are illustrated in FIG. 6 as semi-circular discs, although the permanent magnets may have other shapes. The permanent magnets 22-25 and 32-35 may be made of the same or different materials relative to one another. The permanent magnets 22-25 and 32-35 preferably comprise a hard magnetic material, for example, neodymium or other high performance magnetic materials offering low physical volume and high magnetic flux. As used herein, "hard magnetic material" refers to a material that generates and independently maintains a magnetic field. As best shown in FIG. 5, the "south poles" of the permanent magnets 22 and 25 face and abut the "north" poles of the permanent magnet 24 and 23, respectively. Similarly, the "north poles" of the permanent magnets 32 and 35 face and abut the "south poles" of the permanent magnets 34 and 33, respectively.

An outer (or dry-side) plate 26 is adjacent and abuts the permanent magnets 24 and 25, as best shown in FIGS. 4 and 5. The outer plate 26 preferably is made of a soft magnetic material. As used herein, "soft magnetic material" refers to a material that is influenced by a magnetic field, e.g., is develop a strong magnetic dipole strength when exposed to a strong external magnetic field, but that tends not to generate a magnetic field. Soft magnetic materials do not retain significant remnant magnetism when no longer exposed to the external magnetic field. As an example, the outer plate 26 may be made of steel, for example, mild (utility grade) steel. Mild steel may contain, for example, 0.05 to 0.25 weight percent carbon. Although mild steel is preferred, any soft magnetic material that is highly magnetic may be used.

An inner (or wet-side) plate 36 is associated with the pump 40, preferably internal to the pump 40. In the illustrated embodiment, the inner plate 36 is located behind the rear cover 46. The inner plate 36 preferably also is made of a soft magnetic material. The inner plate 36 may be made of steel, for example mild steel]. Like the outer plate 26, although mild steel is preferred, the inner plate 36 is preferably mild steel although it may also be made of any soft magnetic material that is highly magnetic. The inner plate 36 is magnetically attracted to the permanent magnets 32 through 35. Preferably, the rear cover 46 and any other components between the inner plate 36 and the permanent magnets 32-35 is made of a non-magnetic material (or magnetically inactive material), preferably a polymeric material, such as polycarbonate, polypropylene, or the like. Preferably, the inner and outer plates 26 and 36 and the permanent magnets 22-25 and 32-35 are sized so that they have equal volume. Thus, the inner plate 36 has the same volume as the permanent magnets 22-25, which has the same volume as the permanent magnets 32-35, which has the same volume as the outer plate 26.

Figure 7:
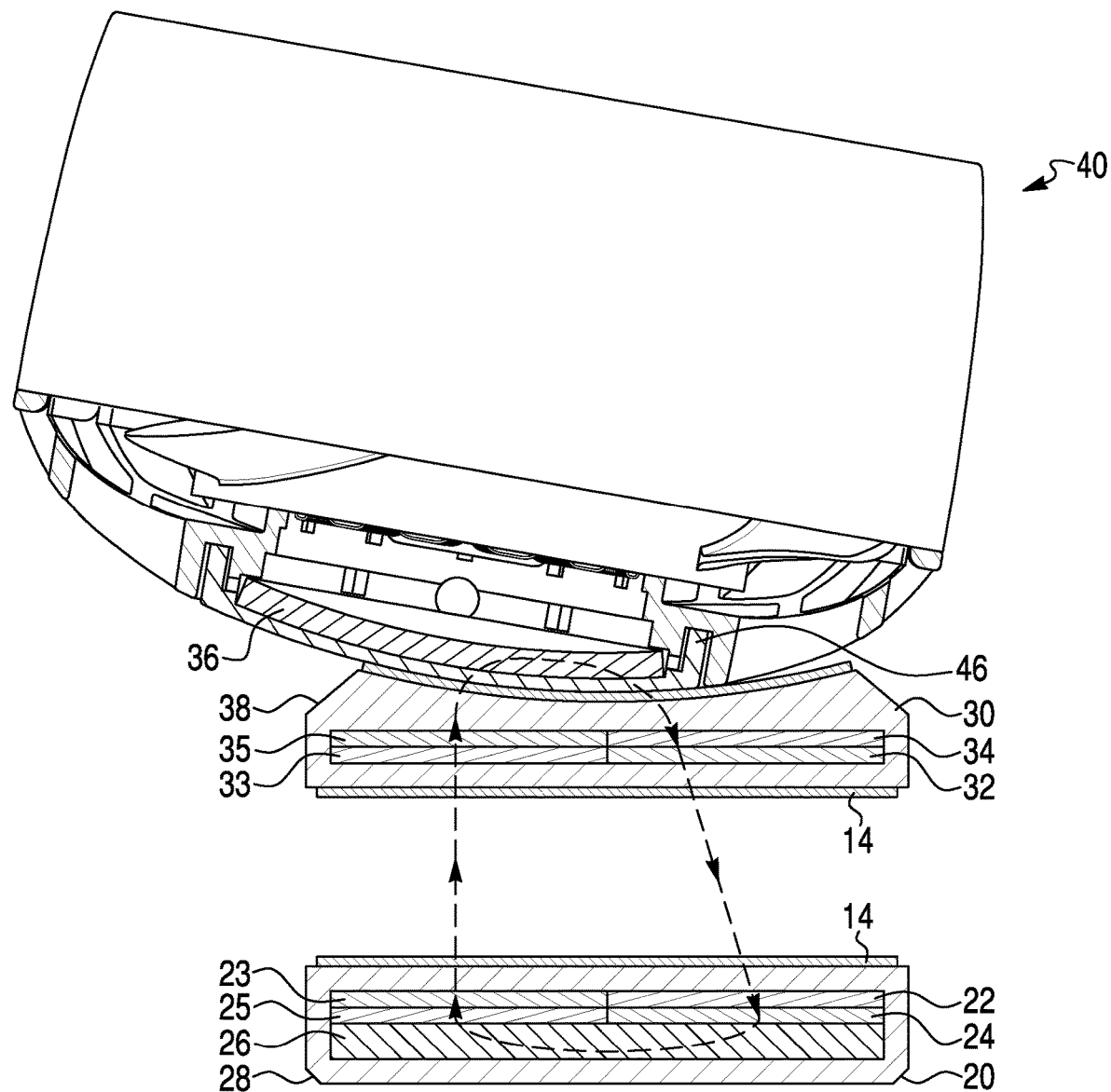
FIG. 7 is an overhead, partially cutaway view of the fluid pump assembly with the pump rotated at an angle to the inner mount.

As best shown in FIGS. 3 and 4, the outer mount 20 further comprises an outer mount housing 28 that contains the permanent magnets 22-25 and the outer plate 26. The inner mount 30 further comprises an inner mount housing 38 that contains the permanent magnets 32-35, but does not contain the inner plate 36, which is associated with, and more preferably contained within, the pump 40. FIG. 5 omits the inner and outer mount housing 28 and 38 for simplification purposes. The outer mount housing 28 and the inner mount housing 38 preferably are made of a non-magnetic material or magnetically inactive material, preferably a polymeric material, such as polycarbonate, polypropylene, or the like. The outer mount housing 28 and the inner mount housing 38 each may contain fewer or more (e.g., one, two, three, four, five, six, etc.) permanent magnets than shown. The number of permanent magnets 22-25 in the outer mount housing 28 may be the same as or different than the number of permanent magnets 32-35 in the inner mount housing 38. The permanent magnets 22-25 in the outer mount housing 28 may be made of the same material as or a different material than the permanent magnets 32-35 in the inner mount housing 38. Preferably, the inner mount 30 includes a concave surface 72 facing the pump 40 (see FIG. 4). Preferably, the concave surface of the inner mount 30 allows the convex surface of the rear 70 of the pump housing to fit therein in a ball-and-socket manner, where the concave surface 72 of the inner mount 30 forms the socket and the convex surface on the rear 70 of the pump housing forms the ball portion. The ball-and-socket arrangement allows the pump 40 to be rotated relative to the inner mount 30, as best shown in FIG. 7.

FIGS. 4 and 5 illustrate a magnetic circuit to which a magnetic field, represented as arrows of magnetic flux, is largely confined. The flux is generated by the permanent magnets 22-25 and 32-35, and is largely confined to the magnetic circuit by the outer plate 26 and inner plate 36, with a small gap (between the permanent magnets 22-25 and the permanent magnets 32-35) at which the tank wall 12 is located. The inner and outer plates 26 and 36 shorten the magnetic flux path of the magnetic field to close the magnetic circuit, and thus to maximize the magnetic attractive forces between the permanent magnets 22-25 and 32-35 and the inner and outer plates 26 and 36. Additionally, because the magnetic circuit is closed and thus the magnetic field contained, the closed magnetic circuit prevents magnetic interference with the operation of the motorized pump 40.

Magnetically attractive forces between the permanent magnets 22-25 and the permanent magnets 32-35 are sufficiently strong (either alone or in combination with the friction layer(s) 14) to cause the outer mount 20 to be magnetically coupled to the inner mount 30 so that the outer mount 20 is held in place on one side of the tank wall 14 and the inner mount 30 (with the magnetically attached pump 40) is held in place on the opposite side of the tank wall 14, preferably without the assistance of a mechanical bracket. Additionally, magnetic attractive forces between the permanent magnets 32-35 and the inner plate 36 are sufficiently strong (either alone or in combination with the layers of friction layer 14) to generate sufficient magnetic coupling to cause the pump 40 to be magnetically held in place in abutting relationship with the inner mount 30, without the assistance of a mechanical bracket or other mechanical attachment.

The closed magnetic circuit allows the attractive force between the outer and inner magnet systems to be maximized, which allows their respective weights to be minimized. Weight reduction thus also minimizes material requirements, resulting in a cost saving.

The magnetically mountable fluid pump assembly 10 is releasably, magnetically coupled on opposite sides of the tank wall 12. The fluid pump assembly 10 may be provided as a kit, preferably with a spacer (not shown) between the outer mount 20 and the inner mount 30 and an additional spacer (not shown) between the inner mount 30 and the pump 40. The attractive force between the permanent magnets is sufficiently high that the spacer facilitates separation of the inner and outer mounts 30 and 20, respectively. The pump 40 is placed adjacent to the inner mount 30. The inner mount 30 and the pump 40 are placed on one side (the "wet side") of the tank wall 12, and the outer mount 20 is placed on the opposite side (the "dry side") of the tank wall 12 to complete the magnetic circuit. Due to the ball-and-socket arrangement between the pump 40 and the inner mount 30, the pump 40 may be rotated relative to the inner mount 30. That way, a user may adjust the position of the pump 40 relative to the inner mount 30 to direct water flow as desired (compare FIGS. 4 and 7). While we prefer a ball and socket arrangement, other connection mechanisms may be utilized to allow the pump to be angularly oriented relative to the inner mount in order to allow the water or other fluid to be directed as desired.

Note that not all of the steps described above in the general description or the examples are required, that a portion of a specific step may not be required, and that one or more further steps may be performed in addition to those described. Still further, the order in which steps are listed are not necessarily the order in which they are performed.

In the foregoing specification, the concepts have been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any claim.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination.

What is claimed is:

1. A fluid pump assembly, comprising:
   a. an outer mount comprising a first permanent magnet;
   b. an inner mount comprising a second permanent magnet; and
   c. a pump comprising a housing containing an inner plate having a soft magnetic material, a rotor body, and a stator configured to interact with the rotor body to rotationally drive the rotor body, the inner plate disposed between the rotor body and the inner mount, wherein
   the inner mount is configured to be positioned on a first side of a wall of a container,
   the outer mount is configured to be positioned on an opposite second side of the wall of the container and in opposing relationship with the inner mount,
   the pump is positioned in an abutting relationship with the inner mount such that the first permanent magnet, the second permanent magnet, and the inner plate collectively establish a magnetic circuit having a sufficient strength to mount and hold the outer mount, the inner mount, and the pump in place on respective sides of the wall of the container without mechanical support,
   the housing comprises an outer cover, a stator outer shell connected to the outer cover, a stator inner shell integrally connected to the stator outer shell, and a rear cover connected to the stator outer shell,
   wherein the stator outer shell has fluid inlets and the outer cover has fluid outlets, the fluid inlets of the stator outer shell and fluid outlets of the outer cover are fluidly connected by a channel to sustain a flow of fluid therethrough.

2. The fluid pump assembly of claim 1, wherein the first permanent magnet comprises a plurality of magnets comprising a hard magnetic material.

3. The fluid pump assembly of claim 1, wherein the outer mount further comprises an outer plate having a second soft magnetic material.

4. The fluid pump assembly of claim 3, wherein the outer plate and the first permanent magnet are contained in an outer mount housing.

5. The fluid pump assembly of claim 1, wherein the inner mount further comprises an inner mount housing enclosing the second permanent magnet.

6. The fluid pump assembly of claim 1, wherein the second permanent magnet comprises a plurality of magnets comprising a hard magnetic material.

7. The fluid pump assembly of claim 1, wherein the outer mount or the inner mount further comprises a friction layer configured to be positioned adjacent to the wall of the container.

8. The fluid pump assembly of claim 1, wherein the rotor body comprises rotor magnets received in an annular compartment, and blades configured for causing the flow of fluid through the pump.

9. The fluid pump assembly of claim 1, wherein the rotor body contains rotor magnets in an annular compartment.

10. The fluid pump assembly of claim 1, wherein the pump further comprises an electricity connection to provide electricity to the stator.

11. The fluid pump assembly of claim 1, wherein the soft magnetic material is steel.

12. The fluid pump assembly of claim 1, wherein the pump is angularly adjustable relative to the inner mount.

13. The fluid pump assembly of claim 12, wherein the inner mount comprises a concave surface, and the pump comprises a convex surface, the convex surface of the pump abuts the concave surface of the inner mount.

14. A fluid pump assembly, comprising:
   a. an outer mount comprising a first permanent magnet;
   b. an inner mount comprising a second permanent magnet; and
   c. a pump comprising:
   a housing having an outer cover, a stator outer shell connected to the outer cover, a stator inner shell integrally connected to the stator outer shell, and a rear cover connected to the stator outer shell,
   wherein the stator outer shell has fluid inlets and the outer cover of the housing has fluid outlets, the fluid inlets and fluid outlets are fluidly connected by a channel for a flow of fluid therethrough, ii. a rotor body locating in the housing and having rotor magnets received in an annular compartment, and blades that are configured for causing the flow of fluid through the pump, iii. a stator locating in the housing and configured to interact with the rotor body to rotationally drive the rotor body for causing the flow of fluid through the fluid inlets to the fluid outlets, and iv. an inner plate positioned behind the rear cover and between the stator/rotor body and the inner mount, wherein the inner mount is configured to be positioned on a first side of a wall of a container, the outer mount is configured to be positioned on an opposite second side of the wall of the container and in opposing relationship with the inner mount, the inner plate is positioned in an abutting relationship with the inner mount such that the first permanent magnet, the second permanent magnet, and the inner plate collectively establish a magnetic circuit having a sufficient strength to mount and hold the outer mount, the inner mount, and the pump in place on respective sides of the wall of the container without mechanical support.

* * * * *